Dec. 11, 1951  R. L. MAYRATH  2,578,142
ELECTRICAL CIRCUIT FOR A TRANSMISSION
AND CLUTCH CONTROL APPARATUS

Filed Oct. 18, 1947  2 SHEETS—SHEET 1

INVENTOR.
Robert L. Mayrath.
BY Harness & Harris
ATTORNEYS

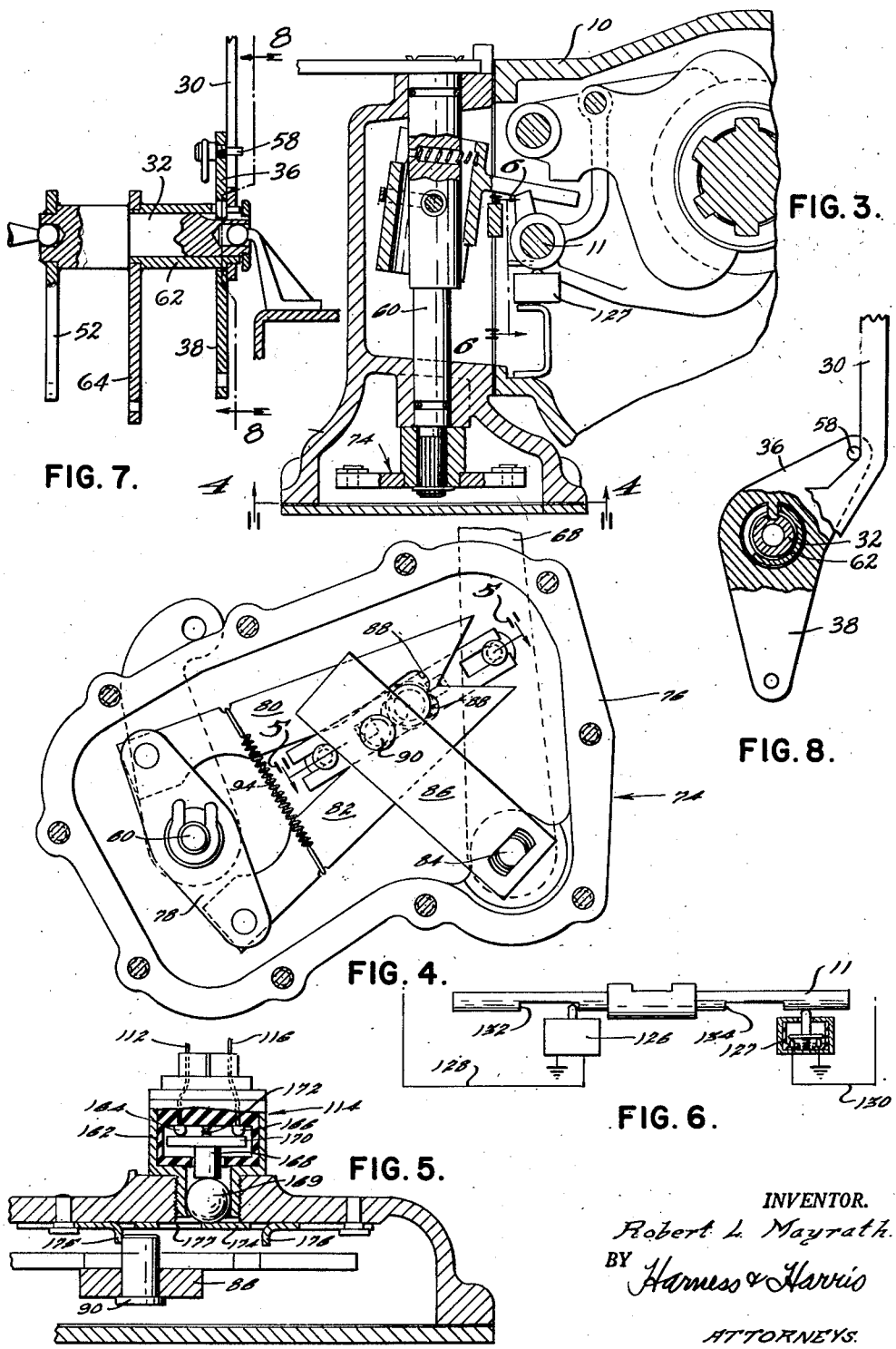

Patented Dec. 11, 1951

2,578,142

UNITED STATES PATENT OFFICE 2,578,142

ELECTRICAL CIRCUIT FOR A TRANSMISSION AND CLUTCH CONTROL APPARATUS

Robert L. Mayrath, Berkley, Mich., assignor to Chrysler Corporation, Highland Park, Mich., a corporation of Delaware Application October 18, 1947, Serial No. 780,722

8 Claims. (Cl. 74—472)

This invention relates to an improved electrical circuit for a transmission and clutch control apparatus for an automotive vehicle.

A control system for a clutch and transmission used in conjunction with a conventional fluid coupling was described in the copending application, Serial No. 770,659 filed August 26, 1947, by David F. Toot and application, Serial No. 780,696 filed October 18, 1947 by David F. Toot. The present invention provides an improved electrical circuit for the control systems described therein, and more particularly simplifies the switch associated with the transmission shift rail and incorporates a grounded switch adapted to be closed when the shift solenoid is energized.

It is a principle object of this invention to provide an electrical circuit which incorporates a supplemental means to ground the shift solenoid thereby eliminating the central terminal provided in the shift rail switches described in the copending application, Serial No. 770,659 filed August 26, 1947, by David F. Toot and application, Serial No. 780,696 filed October 18, 1947, by David F. Toot.

It is a further object of the invention to provide an electrical circuit which will permit the manual shift control lever to be left in its neutral position with the vehicle engine running without requiring the entire automatic control apparatus to be inactivated by operation of the selector switch. Previous electrical circuits such as those described in the copending applications have required that the vehicle operator turn the electrical system off on any occasion when he desired to park the vehicle with the shift control lever in neutral and the engine running. The operation of the switch is an added driving complication. In addition such a system presented a danger that a child, for example, left in the vehicle while the engine is running might through playfulness operate the switch. The mechanism would then place the vehicle in a driving gear and the vehicle would move. The present electrical circuit eliminates the necessity of operating the selector switch and the problem of its unintended operation and vehicle motion.

With electrical systems as previously described a potential danger exists in that on any occasion when the shift lever is accidentally placed in its neutral position a shift is made to the lower speed ratio drive. This is a characteristic of the alternator mechanism described in application, Serial No. 770,659 filed by David F. Toot and application, Serial No. 755,612 filed by Maurice C. Robinson.

It is common knowledge that transmissions occasionally slip out of driving engagement. If this should occur while the vehicle was traveling at a high rate of speed it would be disastrous if the control mechanism shifted the transmission into a lower speed ratio drive. This would occur if the electrical circuit of the copending application, Serial No. 770,659 was used with the alternator mechanism. In applicant's electrical circuit the shift solenoid is not energized when the shift control mechanism is in its neutral position. Therefore, this hazard is eliminated.

It is an object of the invention to provide an electrical circuit which will not operate to change the speed ratio drive unless one of two particular speed ratio drives is at that time in operation. With previous electrical circuits it would be quite possible to produce complications if the driver should absentmindedly turn the selector switch on while the vehicle was being operated in another speed ratio drive such as the low speed commonly associated with the conventional transmission. With these previous circuits it would be unpredictable as to whether the mechanism would place the transmission in second speed drive or in reverse drive for it would be a race between the return of the selector finger to the lower shift rail as against rotation of the finger under the influence of the vacuum cylinder. In applicant's device a circuit to the shift solenoid cannot be established unless the vehicle is operating in second or high speed drive. In copending application, Serial No. 780,718 filed October 18, 1947 by Maurice C. Robinson a switch is provided on the low and reverse shift rail to solve this problem. However, applicant's electrical circuit solves the problem without the addition of an extra switch.

It is a further object of the invention to provide an electrical circuit to produce the above operating characteristics with a minimum of expense. My circuit is particularly adapted to use relatively inexpensive switches in association with the transmission shift rail thereby reducing the cost of the mechanism.

Other objects and advantages of the invention will be apparent from the following description taken in connection with the accompanying drawings, in which:

Fig. 3 is a vertical section of a portion of the mechanism carried by the transmission housing;

Fig. 4 is a section on the line 4—4 of Fig. 3;

Fig. 5 is a partial section taken on the line 5—5 of Fig. 4;

Fig. 6 is a section taken on the line 6—6 of Fig. 3 and showing the transmission shift rail and its associated switches;

Fig. 7 is a partial section of the torque shaft and its associated levers shown mounted on the vehicle frame in Fig. 1; and Fig. 8 is a section on the line 8—8 of Fig. 7.

The control mechanism to be described herein is adapted to actuate a transmission of the type illustrated in Patent No. 2,284,191 and a conventional friction clutch. This control system is particularly adapted for use in conjunction with a friction clutch and transmission when they are associated with a fluid coupling. The relationship of the fluid coupling to the control system is described in the copending application, Serial No. 661,298, filed April 11, 1946, by Carl A. Neracher et al.

Figure 1:
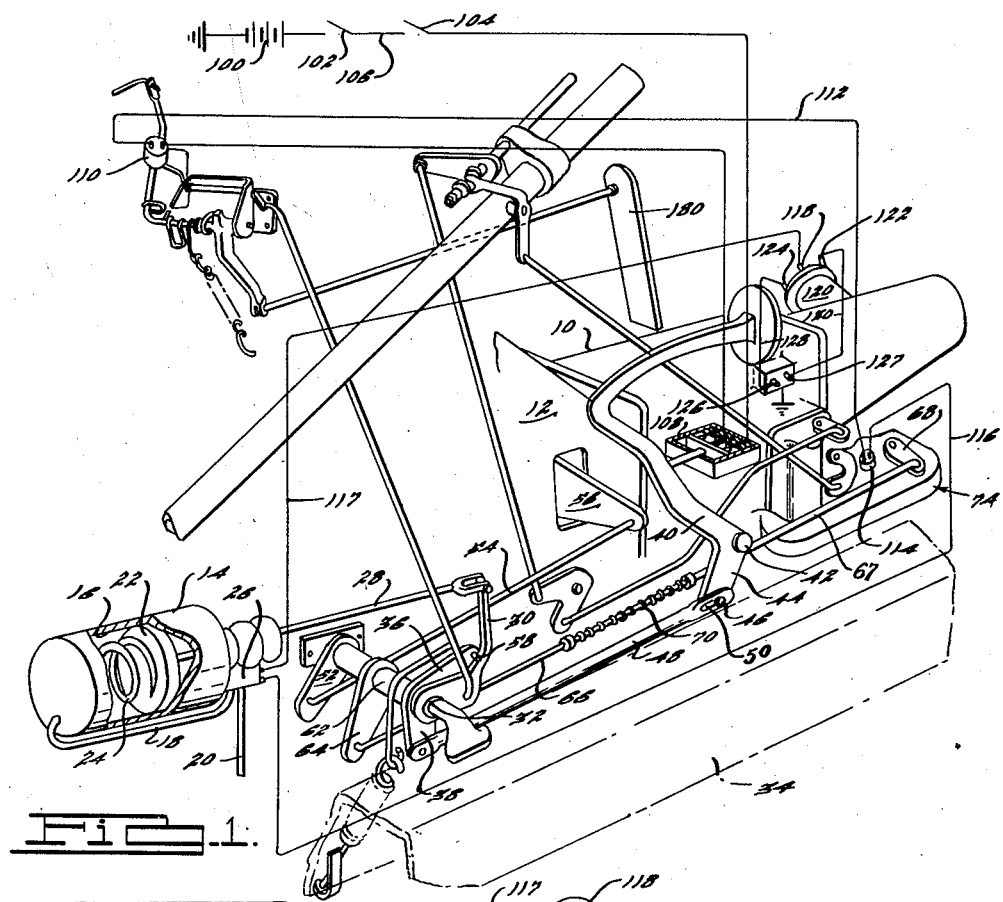
Fig. 1 is a perspective view of a clutch and transmission control apparatus incorporating my invention.

A motor vehicle transmission 10 has a conventional friction clutch 12 operatively associated therewith as illustrated in Fig. 1. An automatic control mechanism is associated with the transmission and clutch and adapted to control the operation thereof in response to predetermined vehicle operating conditions. The automatic transmission control mechanism is superimposed on a manual control of the type described in Patent No. 2,284,191. The selector mechanism described in the above patent is normally in engagement with one of the shift rails. This shift rail is designated by the numeral 11 in the drawings herein. The automatic control apparatus to be described herein only actuates the selector mechanism to move that one shift rail and does not engage the selector mechanism with the other shift rail. Therefore, the discussion herein of a control mechanism will be directed to means to selectively rotate the vertical control shaft of the transmission in opposite directions and thereby move the one shift rail in opposite directions. This rotation of the control shaft will create a relatively fast or a relatively slow speed ratio drive depending upon the direction of movement of the shift rail. For reasons of simplicity this will be referred to herein as effecting a change in the speed ratio drive between that which is commonly referred to in a conventional transmission as a second speed drive and that which is commonly referred to as direct drive. It is to be understood, however, that the movements of the control apparatus could effect any other change in speed ratio drive desired.

The control apparatus is powered by a piston adapted to be actuated under selected vehicle operating conditions by manifold vacuum. An airtight housing 14 containing a cylinder 16 has tubular connections 18 and 20 with the engine intake manifold. A piston 22 is slidably mounted in cylinder 16 and a spring 24 acting on piston 22 and reacting on housing 14 urges piston 22 to one end of cylinder 16. A solenoid actuated valve 26 is positioned between the tubular connections 18 and 20 and adapted when energized to operatively connect the tubular connections 18 and 20 so that air will be evacuated from the cylinder 16 by the intake manifold vacuum of the engine. The solenoid operated valve 26 is also adapted to vent cylinder 16 when it operatively disconnects tubular connections 18 and 20. Manifold low pressure, or vacuum as it is commonly referred to, by evacuating air from cylinder 16 overcomes spring 24 when valve 26 is open thereby moving the piston 22 to the left in Fig. 1. A piston rod 28 connects the piston 22 with an arm 30 which is rotatably mounted on a torque shaft 32. The torque shaft 32 has one end thereof rotatably mounted on the vehicle frame 34 and the other end rotatably mounted adjacent the engine block (not shown) in a manner well known in the art. The torque shaft 32 and its associated levers are illustrated in detail in Figs. 7 and 8. A lever 36 keyed to shaft 32 is provided with a depending arm 38. The usual clutch pedal 40 is rotatably mounted at 42 on a shaft (not shown). An extension 44 of clutch pedal 40 depends below rotatable mounting 42 and has fixed thereto a pin 46. A rod 48 operatively connects arm 38 with pin 46. A slot 50 provided in rod 48 permits relative movement in one direction between rod 48 and pin 46. The upper end of lever 36 may be operatively associated with the usual over center clutch spring. An arm 52 is keyed to torque shaft 32. A rod 54 connects arm 52 with clutch throwout fork 56. Clutch throwout fork 56 engages a collar and operates a friction clutch 12 in a manner well known in the art. A typical clutch is illustrated and described in Patent No. 2,182,407. The lever 36 previously referred to is provided with a pin 58 which is adapted to be engaged by the arm 30 when the latter is rotated in a counterclockwise direction in response to movement of piston 22 under the influence of manifold vacuum. When the solenoid actuated valve 26 is energized and the piston 22 moved to the left in Fig. 1 piston rod 28 rotates arm 30 in a counterclockwise direction. Arm 30 engages and carries therewith the pin 58 associated with lever 36 thereby rotating the lever 36. The lever 36 is keyed to the torque shaft 32 and the torque shaft 32 is thus rotated. Rotation of the shaft 32 rotates the arm 52 which is keyed thereto. This pushes rod 54, rotates clutch throwout fork 56 and disengages the clutch 12. The rotation of the lever 36 and the depending arm 38 in this counterclockwise direction does not cause a depression of the clutch pedal 40 because of the cooperation of the slot 50 in rod 48 and the pin 46. This pin and slot combination permits movement of rod 48 to the right in Fig. 1 without an accompanying depression of clutch pedal 40. When solenoid actuated valve 26 closes the operative connection between tubular connections 18 and 20 and vents the cylinder 16, spring 24 returns the parts described in their original position permitting the clutch to reengage under the influence of its own self contained springs.

The movement of piston 22 also effects a change in transmission speed ratio drive by rotating the vertical control shaft 60. Reference may be made to Patent No. 2,284,191 for a further description of the means by which rotation of shaft 60 effects a change in the transmission speed ratio drive. The torque shaft 32 is provided with a collar 62 which is rotatably mounted thereon. An arm 64 is keyed to collar 62. An arm 68 is provided on a motion translating device 74 to be described herein and a pair of rods 66 and 67 are operably connected by a resilient lost motion connection 70 and respectively connected to arm 64 and arm 68. The resilient connection 70 cushions the motion of arm 68 in response to sudden movement of piston 22. The arm 30 is keyed to collar 62. Movement of the piston 22 is repeated by arm 68. As the piston 22 moves to the left in Fig. 1 the piston rod 28 rotates arm 30 in a counterclockwise direction. Rotation of collar 62 in a counterclockwise direction rotates lever 64 and moves rod 66 to the right in Fig. 1 thereby rotating the arm 68 in a counterclockwise direction. When the solenoid actuated valve closes and vents cylinder 16 the spring 24 returns piston 22 to the right end of housing 14 and moves arm 68 in a clockwise direction.

The arm 68 is adapted to actuate a motion translating device generally designated by the numeral 74. The device 74 is adapted to translate successive counterclockwise (in Fig. 1) rotations of lever 68 to alternate counterclockwise and clockwise rotations of transmission control shaft 60 (Fig. 3). The device 74 is mounted in a housing 76 secured to the lower portion of the transmission 10. A lever 78 has a central portion thereof keyed to the transmission control shaft 60. A pair of fingers 80 and 82 are each rotatably mounted on lever 78 on opposite ends thereof. The arm 68 previously referred to is keyed to a shaft 84 which is mounted in the housing 76. The arm 68 and shaft 84 are rotated in response to movement of the piston 22 in the vacuum cylinder. An arm 86 is keyed to shaft 84 inside of the housing 76. The fingers 80 and 82 are each provided with a recessed portion 88 adapted to receive a pin 90 which is carried by the end portion of arm 86. In operation the pin 90 moves between the fingers 80 and 82. Rotation of the arm 86 in a clockwise direction in Fig. 4 will cause the pin 90 to engage and pull one of the fingers to the right as viewed in Fig. 4 to thereby rotate lever 78 and shaft 60. The direction of rotation of shaft 60 will be dependent upon whether finger 80 or 82 was moved by pin 90. The direction of rotation of shaft 60 will determine the speed ratio drive to be effected by the transmission 10. Rotation of arm 86 in a counterclockwise direction in Fig. 4 is used to index the arm 86 relative to the fingers 80 and 82. The next succeeding clockwise movement of arm 86 will pull the other finger and reverse the rotation of shaft 60 thereby effecting a change in the transmission speed ratio drive. Movement of piston 22 under the influence of vacuum causes the clockwise rotation of arm 86 and the spring return of piston 22 causes the counterclockwise rotation of arm 86. A spring 94 urges the fingers together.

Figure 2:
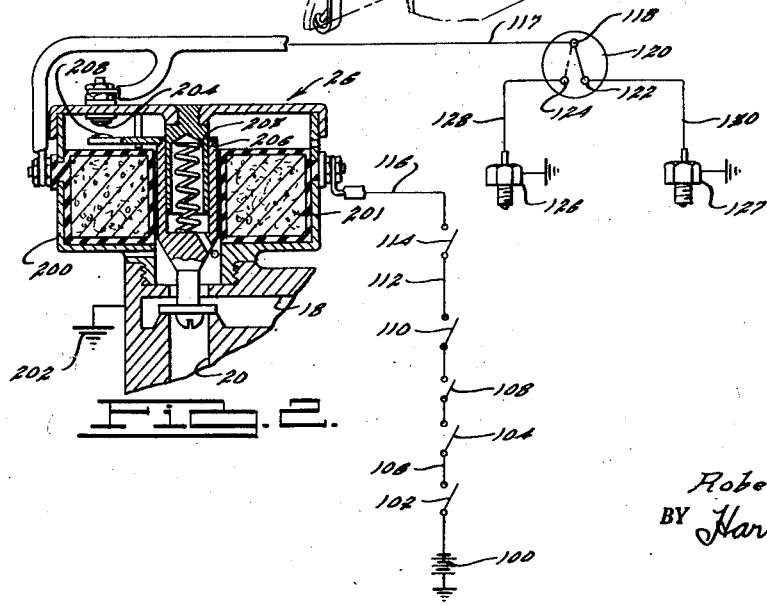
Fig. 2 is a circuit diagram of the electrical circuit used in the Fig. 1 control apparatus.

Means to control the actuation of the valve 26 and piston 22 is illustrated in Figs. 1 and 2. A grounded source 100 of electric energy is connected through ignition switch 102 to a switch 104 by an electrical conductor 106. Switch 104 is adapted to provide a selection between manual and automatic operation of the clutch and transmission and may be placed on the dash or other location convenient to manipulation by the driver of the vehicle. A switch 108 is associated with the clutch pedal 40 as described in copending application, Serial No. 780,718 filed October 18, 1947 by Maurice C. Robinson. Electrical lines connect switches 104 and 108 with a switch 110 adapted to be closed when the throttle is substantially closed. Line 112 connects switch 110 with a switch 114 located in the motion translating mechanism. Line 116 connects switch 114 with the solenoid operated valve 26. Line 117 connects solenoid valve 26 with the inlet terminal 118 of a vehicle speed responsive governor 120. The governor is provided with outlet terminals 122 and 124 and is adapted to electrically connect terminal 118 with the terminal 122 below a predetermined vehicle speed and to electrically connect the terminal 118 with the terminal 124 above this predetermined speed. A pair of grounded switches 126 and 127 are adapted to be actuated by movement of the shift rail in the transmission. These switches are illustrated in Figs. 2 and 6. A line 128 electrically connects the terminal 124 of the speed responsive governor to switch 126. A line 130 connects terminal 122 of the speed responsive governor to switch 127. When the shift rail 11 is moved to its direct drive position which is to the left in Fig. 6, a recess 132 therein permits switch 126 to open. When the shift rail is moved to the right in Fig. 6 a recess 134 therein permits switch 127 to open. Each switch when not aligned with a recess is closed. Thus switch 126 is made in second speed drive and switch 127 made in direct drive.

The switch 114 which is associated with the motion translating mechanism is illustrated in Fig. 5. The lines 112 and 116 are connected to switch 114. A body portion 162 is provided with terminals 164 and 166. These terminals are electrically connected to lines 112 and 116 respectively. A plunger element 168 carries a ball 169 and a contact element 170 which is adapted to bridge the terminals 164 and 166. A spring 172 urges the plunger element 168 downward and away from the terminals. A plate 174 is slidably mounted on the transmission housing and has abutments 175 and 176 provided adjacent its ends. The pin 90 on the arm 86 is adapted to contact the abutments 175 and 176 as an incident to its movement in response to movement of piston 22. The plate 174 is provided with an opening 177 which when aligned with ball 169 permits the ball to project therethrough so that switch 114 is opened. When the arm 86 begins to rotate there is a portion of its movement effected before the switch 114 is turned off by the alignment of opening 177 and ball 169. The switch 114 is thus normally closed but is opened when the change in transmission speed ratio drive is effected by clockwise movement of arm 86. The switch 114 is again closed as an incident to the return of arm 86 to its initial position. The switch assures that the circuit will be broken after the change in transmission speed ratio drive has been effected and before piston 22 has returned to its initial position to reengage the clutch. This serves to prevent the solenoid 26 from remaining energized if the vehicle speed radically changes after the shift has been initiated. The lost motion feature of the switch is provided so that the switch will be on and the solenoid 26 energized until the shift is completed and the other speed ratio drive effected. The use of a lost motion switch is described in the copending application, Serial No. 780,696 filed October 18, 1947 by David F. Toot.

The lever 86 is normally in the position furthest to the left as viewed in Fig. 4. This is the position assumed by the arm 86 when the solenoid actuated valve 26 is deenergized and the piston 22 at rest in the right end of the cylinder 16. When the solenoid valve 26 is energized and the piston 22 moves to the left in Fig. 1 the clutch throwout fork 56 is moved to the right to disengage the clutch and the arm 86 is moved to the right in Fig. 4 to move one of the fingers and thereby rotate the shaft 60 to effect a change in transmission speed ratio drive. When the solenoid valve 26 is deenergized the piston 22 returns to the right in Fig. 1 and the arm 86 is indexed back to the solid line position in Fig. 4 so that it will be in position for the next change in speed ratio drive. The return of piston 22 also permits clutch 12 to reengage under the influence of springs contained therein. If for any reason the solenoid actuated valve 26 did not become deenergized after the clutch had been disengaged and the shaft 60 rotated the reengagement of the clutch would be prevented. The switch 114 is adapted to prevent this situation from occurring.

Referring to Fig. 2 the operation of the electrical circuit thus far described will be explained. In operation, the driver of the vehicle closes the ignition switch 102 as an incident to operation of the vehicle. If the driver wishes the automatic control mechanism described herein to effect for him changes in transmission speed ratio drive he so designates by closing switch 104 on the dash. When the vehicle is operating and the driver desires that a shift or change in speed ratio drive be effected he so signals by releasing his foot from an accelerator pedal 180 thereby closing switch 110. The switch 108 is normally closed during vehicle operation. It will be noted that the switch 114 is normally in its closed position as illustrated in Fig. 5 prior to energization of the control system. The governor terminal 118 has been illustrated in Fig. 2 as in contact with the terminal 122. This indicates that the vehicle speed is low and the lower speed ratio drive desired. Electricity from the grounded storage battery 100 thus passes through the closed switches 102, 104, 108, 110, 114 and through the solenoid valve 26 to the terminals 118 and 122 to switch 127. If the vehicle is at that time operating in direct drive the shift rail 11 is in the left hand position in Fig. 6 and the switch 127 is closed thus providing a ground for the circuit. The solenoid actuated valve 26 is thereby energized. The energization of valve 26 exposes the cylinder 16 to the intake manifold of the engine thereby moving piston 22 to the left in Fig. 1 to disengage the clutch 12 and to rotate transmission control shaft 60. Rotation of shaft 60 moves the shift rail 11 to the right in Fig. 6 to effect a lower speed ratio drive. The movement of the shift rail 11 to the right opens switch 127 and closes switch 126. As long as the vehicle speed remains below the predetermined governor speed the circuit is broken by the governor 120 and valve 26 deenergized. When the circuit is broken and the solenoid actuated valve 26 deenergized piston 22 is moved to the right in Fig. 1 by spring 24. This indexes the arm 86 of the motion translating mechanism of Fig. 4 and permits the clutch 12 to reengage. During normal operation of the vehicle the driver will then depress the accelerator pedal 180 thereby opening switch 110. If the vehicle should then accelerate sufficiently so that the predetermined speed of the governor is exceeded the terminal 118 thereof will be electrically connected with the terminal 124. Since the vehicle is operating in its lower speed ratio drive with the shift rail 11 moved to the right in Fig. 6 the switch 126 is closed. If under these conditions the operator releases the accelerator pedal 180 and the switch 110 is closed a circuit is established and solenoid valve 26 is energized. The energization of solenoid valve 26 causes a clutch disengagement and a shift to direct drive in the transmission which deenergizes valve 26 and causes a clutch reengagement. However, after the solenoid 26 is initially energized as described above it becomes desirable to have it remain energized until the change in transmission speed ratio drive is completed. This cannot be assured as long as the energization is dependent upon the vehicle speed and the operation of governor controlled switch 120. Therefore I have provided a supplemental means to maintain a ground for the circuit which is independent of the switches 120, 126 and 127. The solenoid operated valve 26 comprises a coil 201 located in a housing or casing 200. A valve stem 206 is lifted by energization of the coil and returned by a spring 203 when the coil is deenergized. The valve casing 200 associated with the solenoid operated valve 26 is grounded at 202 and provided with an insulated terminal 204 electrically connected to line 117. The valve stem 206 is provided with a terminal 208 adapted to contact the terminal 204. When the solenoid valve 26 is energized the valve stem 206 moves upward in Fig. 2 and the contacts 204 and 208 engage thereby providing a ground for the circuit through contacts 204, 208, valve stem 206, casing 200 and ground 202. This ground is completely independent of switches 126 and 127 and vehicle speed responsive switch 120 except that they are required for the initial energization of the circuit. After the change in transmission speed ratio drive has been effected the switch 114 is opened. This deenergizes solenoid valve 26 and permits spring 24 to return the piston to its initial position thereby permitting the clutch to reengage and permitting the alternator switch 114 to close preparatory to the next change in speed ratio drive.

I claim:

1. A control for an automotive transmission having components adapted to be moved to effect a first and a second speed ratio drive comprising a power element, motion transmitting means operatively connecting said power element and said components and adapted to move said components in response to movement of said power element, a solenoid, means associated with said solenoid and adapted to effect movement of said power element when said solenoid is energized, a grounded source of electric energy electrically connected to said solenoid, electrical circuit means responsive to vehicle speed and speed ratio drive to control the initial energization of said solenoid by providing a ground therefore under predetermined conditions of vehicle speed and speed ratio drive a supplemental circuit to ground said solenoid including grounded switch means adapted to be closed by the energization of said solenoid to maintain energization of said solenoid independently of subsequent deviations of vehicle speed and ratio drive from said predetermined conditions, and switch means operatively associated with said motion transmitting means and adapted to open said circuits to deenergize said solenoid when said motion transmitting means is in a predetermined position.

2. A control for an automotive transmission having components adapted to be moved to effect a first and a second speed ratio drive comprising a power element, motion transmitting means operatively connecting said power element and said components and adapted to move said components in response to movement of said power element, a solenoid, means associated with said solenoid and adapted to effect movement of said power element when said solenoid is energized, a grounded source of electric energy electrically connected to said solenoid, a plurality of means to ground said solenoid to complete a circuit to said source through said solenoid, including a first means to ground said solenoid when a first predetermined set of conditions of vehicle speed and speed ratio drive are obtained as an incident to operation of said vehicle, a second means to ground said solenoid when a second predetermined set of conditions of vehicle speed and speed ratio drive are obtained and a third means to ground said solenoid including grounded switch means adapted to be closed as an incident to energization of said solenoid to maintain energization of said solenoid regardless of the subsequent condition of said first and second means, and switch means operatively associated with said motion transmitting means and adapted to deenergize said solenoid when said motion transmitting means is in a predetermined position.

3. In an automotive vehicle provided with a transmission having change speed mechanism operable to provide a first and a second speed ratio drive, an electrical system comprising a vehicle speed responsive switch having a first electrical circuit therethrough above a predetermined vehicle speed and a second electrical circuit therethrough below a predetermined vehicle speed, a second switch electrically connected to said first electrical circuit and adapted to ground said first circuit when said transmission is operating in said first speed ratio drive, a third switch electrically connected to said second electrical circuit and adapted to ground said second circuit when said transmission is operating in said second speed ratio drive, a power element motion transmitting means operatively connecting said power element and said change speed mechanism for operating the transmission between said first and said second speed ratio drives, electromagnetic means for controlling the movement of said power element, said electromagnetic means being adapted when energized to initiate movement of said power element and motion transmitting means to effect a change in speed ratio drive by said change speed mechanism, a grounded source of electric energy, a first electrical connection between said source and said electromagnetic means, a second electrical connection between said electromagnetic means and said vehicle speed responsive switch, a grounded fourth switch electrically connected to said second electrical connection and adapted to ground said second connection when said electromagnetic means is energized whereby the initial energization of said electromagnetic means is obtained by grounding said system through said vehicle speed switch and said second or said third switch and energization of said solenoid is thereafter maintained by said grounded fourth switch, and switch means operatively associated with said motion transmitting means and adapted to open said first electrical connection to deenergize said electromagnetic means when said motion transmitting means is in a predetermined position.

4. In an automotive vehicle provided with an engine having a throttle, a driver operated throttle control and a variable transmission having change speed mechanism operable to provide a first and a second speed ratio drive, an electrical system comprising a vehicle speed responsive switch having a first electrical circuit therethrough above a predetermined vehicle speed and a second electrical circuit therethrough below a predetermined vehicle speed, a second switch electrically connected to said first electrical circuit and adapted to ground said first circuit when said transmission is operating in said first speed ratio drive, a third switch electrically connected to said second electrical circuit and adapted to ground said second circuit when said transmission is operating in said second speed ratio drive, a power element motion transmitting means operatively connecting said power element and said change speed mechanism for operating the transmission between said first and said second speed ratio drives, electromagnetic means for controlling the movement of said power element, said electromagnetic means being adapted when energized to initiate movement of said power element and motion transmitting means to effect a change in speed ratio drive by said change speed mechanism, a grounded source of electric energy, a fourth switch associated with said throttle control and adapted to be closed when said throttle approaches a closed position, means providing a path for electric current from said source to said throttle control switch and from said throttle control switch to said electromagnetic means, means forming a path for electric current from said electromagnetic means to said vehicle speed responsive switch, a grounded fifth switch electrically connected to said second electrical path and adapted to ground said second path when said electromagnetic means is energized whereby the initial energization of said electromagnetic means is obtained by closing said throttle control switch and grounding said system through said vehicle speed switch and said second or said third switch and energization of said solenoid is thereafter maintained through said throttle control switch by said grounded fifth switch, and switch means operatively associated with said motion transmitting means and adapted to deenergize said electromagnetic means when said motion transmitting means is in a predetermined position.

5. In an automotive vehicle provided with an engine having a throttle, a driver operated throttle control and a variable speed transmission having a first and a second speed ratio drive, an electrical system comprising a vehicle speed responsive switch having a first electrical circuit therethrough above a predetermined vehicle speed and a second electrical circuit therethrough below a predetermined vehicle speed, a second switch electrically connected to said first electrical circuit and adapted to ground said first circuit when said transmission is operating in said first speed ratio drive, a third switch electrically connected to said second electrical circuit and adapted to ground said second circuit when said transmission is operating in said second speed ratio drive, power means for operating the transmission between said first and said second speed ratio drives, electromagnetic means for controlling the operation of said power means, said electromagnetic means being adapted when energized to initiate a change in speed ratio drive by said power means, a grounded source of electric energy, a fourth switch associated with said throttle control and adapted to be closed when said throttle approaches a closed position, a fifth switch associated with said power means, means to open said fifth switch under all conditions when said power means is in other than a predetermined condition, means providing a path for electric current from said source to said electromagnetic means through said fourth and said fifth switches, means forming a path for electric current from said electromagnetic means to said vehicle speed responsive switch and a grounded sixth switch electrically connected to said second electrical path and adapted to ground said second path when said electromagnetic means is energized whereby the initial energization of said electromagnetic means is obtained by closing said throttle control switch when said power means is in said predetermined condition and grounding said system through said vehicle speed switch and said second or said third switch and energization of said solenoid is thereafter maintained through said throttle control switch by said fifth switch and said grounded sixth switch.

6. A control for an automotive transmission and clutch, said transmission having components adapted to be moved to effect a first speed ratio drive and a second speed ratio drive and said clutch having components movable to engaged and disengaged positions, said control comprising a power element movable in a first direction and return, motion transmitting means operatively connecting said power element with said clutch components and operatively connecting said power element with said transmission components so that motion of said power element in its first direction effects a disengagement of said clutch and movement of said transmission components and return movement of said power element effects a reengagement of said clutch, a solenoid, means associated with said solenoid and adapted to effect movement of said power element in said first direction when said solenoid is energized, spring means to effect the return movement of said power element when said solenoid is deenergized, a grounded source of electric energy electrically connected to said solenoid, electrical circuit means responsive to vehicle speed and speed ratio drive to control the initial energization of said solenoid by providing a first ground therefor under predetermined conditions of vehicle speed and speed ratio drive, a supplemental circuit to ground said solenoid including a switch having relatively movable contact elements, one of said contact elements being electrically connected to said electrical circuit means and the other of said contact elements being grounded, one of said contact elements being mounted for movement in response to energization of said solenoid to close said switch and provide a ground for said solenoid in addition to said first ground, and switch means operatively associated with said motion transmitting means and adapted to deenergize said solenoid for reengagement of said clutch in response to movement of said motion transmitting means to a predetermined position.

7. A control for an automotive transmission and clutch, said transmission having components adapted to be moved to effect a first speed ratio drive and a second speed ratio drive and said clutch having components movable to engaged and disengaged positions, said control comprising a power element movable in a first direction and return, motion transmitting means operatively connecting said power element with said clutch components and operatively connecting said power element with said transmission components so that motion of said power element in its first direction effects a disengagement of said clutch and movement of said transmission components and return movement of said power element effects a reengagement of said clutch, a solenoid, means associated with said solenoid and adapted to effect movement of said power element in said first direction when said solenoid is energized, spring means to effect the return movement of said power element when said solenoid is deenergized, a grounded source of electric energy electrically connected to said solenoid, a plurality of means to ground said solenoid to complete a circuit to said source through said solenoid including a first means to ground said solenoid when a first predetermined set of conditions of vehicle speed and speed ratio drive are obtained as an incident to operation of said vehicle, a second means to ground said solenoid when a second predetermined set of conditions of vehicle speed and speed ratio drive are obtained, a third means to ground said solenoid as an incident to energization thereof whereby the initial energization of said solenoid is dependent upon vehicle speed and speed ratio drive and the continued energization of said solenoid is independent of vehicle speed and speed ratio drive, and switch means operatively associated with said motion transmitting means and adapted to deenergize said solenoid for reengagement of said clutch in response to movement of said motion transmitting means to a predetermined position.

8. In an automotive vehicle, an engine, a transmission having change speed mechanism operable to provide a first and a second speed ratio drive, a clutch having relatively movable components adapted to be engaged to provide a power transmitting connection between said engine and said transmission and to be disengaged to operatively disconnect said engine and said transmission, an electrical control system for said clutch and said transmission comprising a vehicle speed responsive switch having a first electrical circuit therethrough above a predetermined vehicle speed and a second electrical circuit therethrough below a predetermined vehicle speed, a second switch electrically connected to said first electrical circuit and adapted to ground said first circuit when said transmission is operating in said first speed ratio drive, a third switch electrically connected to said second electrical circuit and adapted to ground said second circuit when said transmission is operating in said second speed ratio drive, a power element movable in a first direction and return, motion transmitting means operatively connecting said power element with said clutch components and operatively connecting said power element with said change speed mechanism so that motion of said power element in its first direction effects a disengagement of said clutch and movement of said transmission components and return movement of said power element effects a reengagement of said clutch, a solenoid, means associated with said solenoid and adapted to effect movement of said power element in said first direction when said solenoid is energized, spring means to effect the return movement of said power element when said solenoid is deenergized, a grounded source of electric energy, a first electrical connection between said source and said solenoid and a second electrical connection between said solenoid and said vehicle speed responsive switch and a grounded fourth switch electrically connected to said second electrical connection and adapted to ground said second connection when said solenoid is energized whereby the initial energization of said solenoid is obtained by grounding said system through said vehicle speed switch and said second or said third switch and subsequent energization of said solenoid is maintained by said grounded fourth switch, and switch means operatively associated with said motion transmitting means and adapted to deenergize said solenoid for reengagement of said clutch in response to movement of said motion transmitting means to a predetermined position.

ROBERT L. MAYRATH.

REFERENCES CITED

The following references are of record in the file of this patent:

UNITED STATES PATENTS

| Number | Name | Date |
|---|---|---|
| 1,864,103 | Tenbrook | June 21, 1932 |
| 2,177,662 | Kliesrath | Oct. 31, 1939 |
| 2,187,824 | Britton | Jan. 23, 1940 |
| 2,208,384 | Morrison | July 16, 1940 |
| 2,208,828 | Adams | July 23, 1940 |
| 2,222,913 | Pescara | Nov. 26, 1940 |
| 2,287,272 | Price et al. | June 23, 1942 |
| 2,351,067 | Randol | June 13, 1944 |
| 2,434,717 | Randol | Jan. 20, 1948 |